United States Patent
Broccolini et al.

(10) Patent No.: US 11,261,852 B2
(45) Date of Patent: Mar. 1, 2022

(54) THERMAL ACTUATOR

(71) Applicant: PRATT & WHITNEY CANADA CORP., Longueuil (CA)

(72) Inventors: Ignazio Broccolini, Montreal (CA); Marc-Andre Tremblay, Montréal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/722,282

(22) Filed: Dec. 20, 2019

(65) Prior Publication Data
US 2020/0217305 A1   Jul. 9, 2020

Related U.S. Application Data

(60) Provisional application No. 62/790,137, filed on Jan. 9, 2019.

(51) Int. Cl.
| *F03G 7/06*  | (2006.01) |
| *F16K 31/00* | (2006.01) |
| *F16K 31/16* | (2006.01) |

(52) U.S. Cl.
CPC .............. *F03G 7/06* (2013.01); *F16K 31/002* (2013.01); *F16K 31/16* (2013.01)

(58) Field of Classification Search
CPC ........... F03G 7/06; F16K 31/002; F16K 31/16
USPC .................................................. 60/527–529
See application file for complete search history.

(56) References Cited

U.S. PATENT DOCUMENTS

| 2,323,533 A | | 7/1943 | Giesler | |
| 2,838,936 A | * | 6/1958 | Goodrich | H01H 37/54 60/527 |
| 3,204,461 A | * | 9/1965 | Szekely | G05D 23/121 60/529 |
| 3,659,783 A | | 5/1972 | Schwartz | |
| 4,507,921 A | * | 4/1985 | Hammarstedt | G05D 23/121 60/527 |
| 5,177,969 A | * | 1/1993 | Schneider | B25J 9/14 60/527 |
| 5,509,269 A | * | 4/1996 | Kuze | G05D 23/02 60/527 |
| 6,148,842 A | * | 11/2000 | Kappel | F02M 61/167 137/78.1 |
| 2007/0090200 A1 | | 4/2007 | Lamb et al. | |
| 2013/0264393 A1 | * | 10/2013 | Onishi | G01K 5/44 236/93 A |
| 2015/0037140 A1 | | 2/2015 | Biyani et al. | |

FOREIGN PATENT DOCUMENTS

EP        1659352 A2    5/2006

OTHER PUBLICATIONS

European Search Report issued in EP counterpart dated May 28, 2020.

* cited by examiner

*Primary Examiner* — Hoang M Nguyen
(74) *Attorney, Agent, or Firm* — Norton Rose Fulbright Canada LLP

(57) ABSTRACT

A thermal actuator has a bellows construction with a heat-transfer fluid (e.g. oil) located outside the bellows and a thermal expansion material (e.g. wax) located inside the interior volume of the bellows.

15 Claims, 1 Drawing Sheet

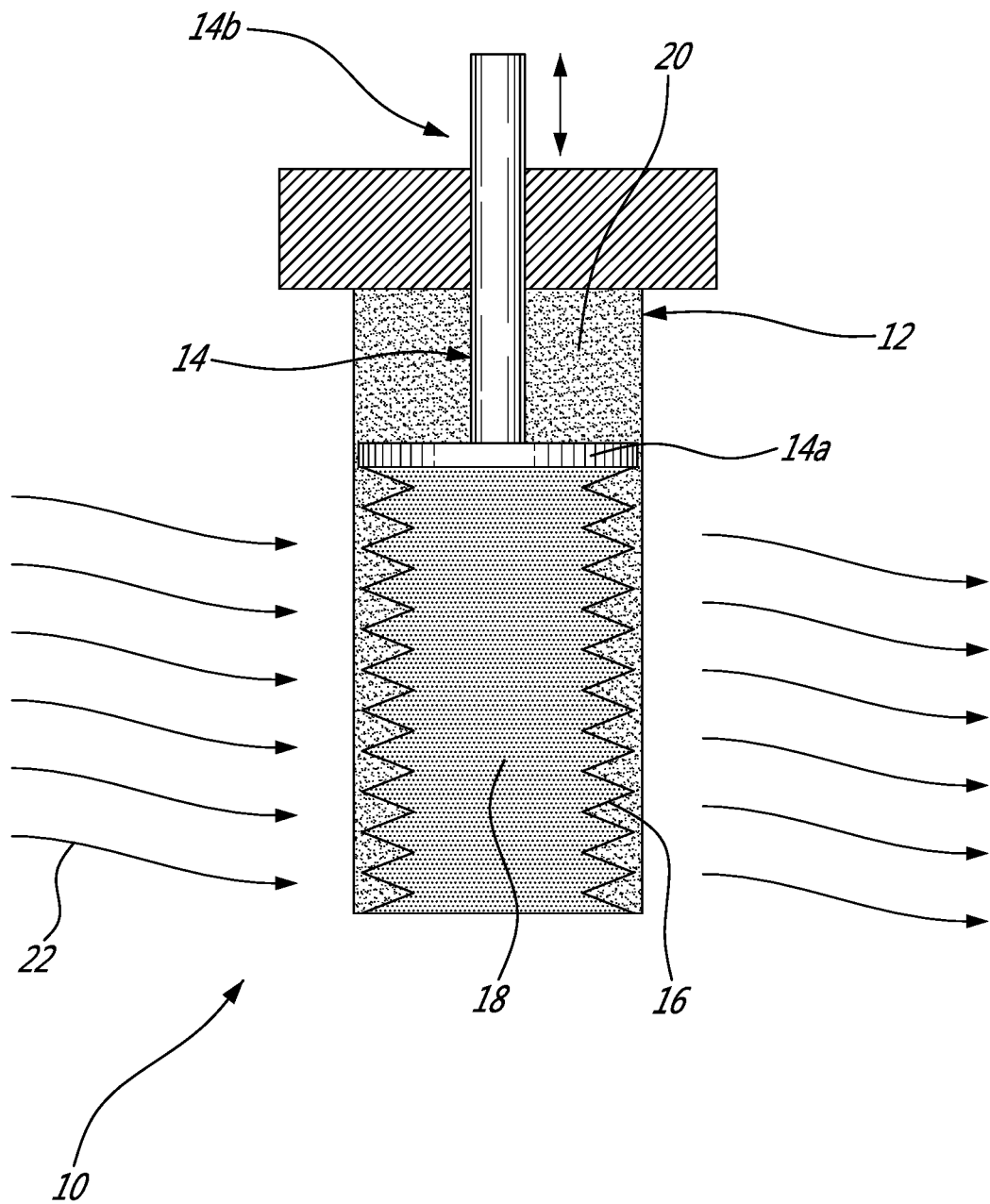

THERMAL ACTUATOR

CROSS-REFERENCE TO RELATED APPLICATIONS

This application claims priority to U.S. provisional patent application No. 62/790,137 filed Jan. 9, 2018, the entire contents of which is incorporated by reference herein.

TECHNICAL FIELD

The disclosure generally relates to thermal actuators for converting thermal energy into mechanical energy.

BACKGROUND OF THE ART

Aircraft engines typically comprise engine fluid temperature control systems. For instance, heat exchangers have been employed to maintain engine fluids within a desired range of temperatures. Heat exchanger systems often comprise thermal actuators and bypass valves to regulate the flow of engine fluids through the heat exchanger as a function of a sensed fluid temperature. While thermal actuators are known, there is a continued need for new thermal actuators, which are particularly suited for aircraft applications.

SUMMARY

In accordance with a general aspect, there is provided a thermal actuator including a metal bellows filled with wax and with an oil film on the outside of the bellows.

In accordance with a further general aspect, there is provided a thermal actuator comprising: a metal bellows; a thermal expansion material located inside the metal bellows; a housing surrounding the metal bellows; a piston movable relative to the housing in response to expansion and contraction of the thermal expansion material; and a heat-transfer fluid between the housing and the metal bellows, the heat-transfer fluid in heat exchange relationship with the thermal expansion material inside the metal bellows.

In accordance with another general aspect, there is provided a thermal actuator comprising: a housing; a movable element coupled to the housing and displaceable relative to the housing; a bellows mounted inside the housing and coupled to the movable element; a thermal expansion material disposed inside an interior volume of the bellows, the thermal expansion material configured to cause the bellows to expand and contract in accordance with an expansion condition of the thermal expansion material; and a heat-transfer fluid surrounding the bellows inside the housing, the heat-transfer fluid in heat exchange relationship with the thermal expansion material through the bellows.

In accordance with a still further general aspect, there is provided a thermally responsive wax actuator comprising: a housing, a metal bellows mounted inside the housing, a body of wax filling the metal bellows, the metal bellows displaceable between an expanded position and a contracted position in accordance with an expansion state of the body of wax, a piston operatively coupled to the metal bellows for movement therewith relative to the housing, and a body of oil surrounding the metal bellows inside the housing.

DESCRIPTION OF THE DRAWING

FIG. 1 is an example of a thermal actuator in accordance with an embodiment.

DETAILED DESCRIPTION

Thermal actuators are mechanical devices that convert thermal energy into mechanical energy (e.g. motion or movement of a load). FIG. 1 illustrates one example of such thermal actuators, which uses the expansion of a thermal expansion material (e.g. a mass of thermostatic temperature responsive material such as a wax compound) as a means of moving a movable element such as a piston/plunger to perform a given function in response to temperature cycling. The thermal expansion material could be a liquid, a gas, a wax-like substance or other material that changes volume based on temperature. In the case of waxes, the material is engineered to undergo a phase change within a specific temperature range. When the temperature rises above the wax melting point, the wax changes phase from solid to liquid, expanding in volume significantly. It is noted that a wide range of waxes can be used ranging from highly refined hydrocarbons to waxes extracted from vegetable matter. Specific examples include paraffin waxes in the straight-chain n-alkanes series.

FIG. 1 illustrates a particular embodiment of a thermal actuator 10 suitable for aircraft applications. The thermal actuator 10 could for example be used for the regulation of the temperature of a) fuels, b) engine coolants, and/or c) lubricants. For instance, the thermal actuator 10 could be used on aircraft engine fuel-oil heat exchangers (not shown) as a bypass valve actuator for controlling the quantity of fluid flowing through the heat exchanger.

The exemplary actuator 10 shown in FIG. 1 generally comprises a housing 12, a piston 14 movably mounted for reciprocating movement in the housing 12, and a variable volume enclosure 16 also mounted in the housing 12 and operatively connected to the piston 14. In accordance with a particular embodiment, the variable volume enclosure 16 is provided in the form of a metal bellows (i.e. an enclosure of variable volume with wall like those of an accordion). The variable volume enclosure can be a welded metal bellows.

The piston 14 has a piston head 14a connected to one end of the variable volume reservoir 16 and a piston rod 14b projecting axially from the piston head 14a in a direction away from the variable volume reservoir 16. The distal end of the piston rod 14b projects externally from one end of the housing 12 for engagement with a load to be driven or a device (e.g. a valve or a switch) to be actuated.

The opposed end of the variable volume reservoir 16 is sealingly connected to the bottom end of the housing 12. In accordance with a particular embodiment, the sealed internal volume of the variable volume reservoir 16 is filled with wax 18 as the thermal expansion material. The wax 18 is, thus, encapsulated inside the variable volume reservoir 16 between the bottom of the actuator housing 12 and the piston head 14a. In operation, as the wax 18 is heated or cooled, it changes phase and, thus, expand or contract, thereby driving the variable volume reservoir 16, which then moves the piston 14.

A heat transfer-fluid 20 is provided between the variable volume reservoir 16 and the actuator housing 12 to promote a more uniform temperature distribution along the bellows convolutions of the variable volume reservoir 16. The heat-transfer fluid 20 outside the variable volume reservoir 16 (e.g. outside the metal bellows) can be a gas or a liquid having high thermal conductivity. For instance, oil can be used as a suitable heat-transfer fluid. The oil can be provided to form a small film of oil between the housing 12 and the bellows. According to one embodiment, the presence of oil in the housing 12 outside the metal bellows provide a more uniform heat distribution, thereby helping the wax particles along the bellows convolutions to soften first. This potentially reduces the risk of wax entrapment during contraction. Ultimately, the use of a heat-transfer fluid, such as oil, may lead to lower stresses in the metal bellows and, thus, longer cycle life capability for the thermal actuator 10.

As schematically illustrated in FIG. 1, the thermal actuator 10 is operatively exposed or connected in heat exchange relationship with a sensing fluid 22. According to one application, the sensing fluid 22 is a fluid discharged from a heat exchanger (not shown) used to cool down an engine fluid of an aircraft engine. The thermal load carried by the sensing fluid 22 is transferred to the heat-transfer fluid 20 and then from the heat-transfer fluid 20 to the thermal expansion material (e.g. wax 18). Accordingly, the thermal expansion material expands or contracts due to the presence of high or low temperature fluid surrounding the housing 12.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A thermal actuator comprising:
a metal bellows having bellows convolutions longitudinally distributed between a first end and a second end;
a thermal expansion material located inside the metal bellows;
a housing defining a sealed enclosure around the metal bellows, the housing having a first end and a second end and a sidewall extending longitudinally between the first end and the second end, the sidewall longitudinally overlapping the bellows convolutions, the housing exposed to a temperature sensing fluid flowing over an outer surface of the sidewall of the housing, the temperature sensing fluid carrying a thermal load;
a piston movable relative to the housing in response to expansion and contraction of the thermal expansion material; and
a heat-transfer fluid contained in the sealed enclosure around the metal bellows, the metal bellows immersed in the heat-transfer fluid, the heat transfer fluid covering the bellows convolutions from the first end to the second end of the metal bellows to promote uniform temperature distribution along the bellows convolutions, the heat-transfer fluid in heat exchange relationship with the thermal expansion material inside the metal bellows, the heat-transfer fluid configured to transfer the thermal load from the temperature sensing fluid to the thermal expansion material via the sidewall of the housing.

2. The thermal actuator defined in claim 1, wherein the heat-transfer fluid is oil, the oil forming a film of oil along all the bellows convolutions.

3. The thermal actuator defined in claim 1, wherein the thermal expansion material is wax.

4. The thermal actuator defined in claim 1, wherein the thermal expansion material is wax and the heat-transfer fluid is oil.

5. The thermal actuator defined in claim 1, wherein the metal bellows is sealingly coupled at one end thereof to a piston head of the piston inside the housing, the sidewall of the housing being thermally conductive between the first and the second ends of the housing.

6. The thermal actuator defined in claim 5, wherein the piston is mounted for reciprocating movement inside the housing.

7. A thermal actuator comprising: a housing having a sidewall extending longitudinally between a first end and a second end, the sidewall exposed to a temperature sensing fluid flowing over an outer surface of the sidewall, the temperature sensing fluid carrying a thermal load; a movable element coupled to the housing and displaceable relative to the housing; a bellows mounted inside the housing and coupled to the movable element, the bellows having a first and a second end with bellows convolutions longitudinally distributed between the first and second ends; a thermal expansion material disposed inside an interior volume of the bellows, the thermal expansion material configured to cause the bellows to expand and contract in accordance with an expansion condition of the thermal expansion material; and a heat-transfer fluid sealingly enclosed in the housing around the bellows, the bellows immersed in the heat-transfer fluid, the heat-transfer fluid covering the bellows convolutions from the first end to the second end of the bellows, the heat-transfer fluid in heat exchange relationship with the thermal expansion material through the bellows along all bellows convolutions, the heat-transfer fluid configured to transfer the thermal load from the temperature sensing fluid to the thermal expansion material via the sidewall of the housing.

8. The thermal actuator defined in claim 7, wherein the thermal expansion material is a wax compound.

9. The thermal actuator defined in claim 8, wherein the bellows is a welded metal bellows.

10. The thermal actuator defined in claim 8, wherein the heat-transfer fluid is oil, the oil forming a thermal bridge between the sidewall of the housing and the bellows convolutions.

11. The thermal actuator defined in claim 7, wherein the movable element comprises a piston mounted for reciprocating movement inside the housing.

12. The thermal actuator defined in claim 11, wherein the interior volume of the bellows is closed at the first end by the housing and at the second end opposite the first end by a piston head of the piston.

13. A thermally responsive wax actuator comprising: a housing defining an enclosure having a sidewall extending longitudinally between a first end and a second end, the housing disposed in a flow path of a temperature sensing fluid carrying a thermal load, the sidewall of the housing in heat exchange relationship with the temperature sensing fluid flowing thereover, a metal bellows mounted inside the enclosure, the metal bellows having a plurality of bellows convolutions formed between a first and a second end, a body of wax filling the metal bellows, the metal bellows displaceable between an expanded position and a contracted position in accordance with an expansion state of the body of wax, a piston operatively coupled to the metal bellows for movement therewith relative to the housing, and a body of oil filling the enclosure around the metal bellows, the body of oil forming a film of oil along the bellows convolutions from the first end to the second end of the metal bellows, the film of oil in heat exchange relationship with the temperature sensing fluid via the sidewall of the housing; the body of oil in the enclosure configured to transfer the thermal load carried by the temperature sensing fluid to the body of wax along a full extent of the metal bellows to promote uniform temperature distribution along the bellows convolutions.

14. The thermally responsive wax actuator defined in claim 13, wherein metal bellows is closed at a first end by the housing and at a second end by a piston head of the piston.

15. The thermally responsive wax actuator defined in claim 14, wherein the piston head is mounted for reciprocal movement within the housing.

\* \* \* \* \*